(12) United States Patent
Santana De Vega et al.

(10) Patent No.: US 11,840,613 B2
(45) Date of Patent: Dec. 12, 2023

(54) Z-PIN FOR INCREASING DELAMINATION RESISTANCE

(71) Applicant: ROLLS-ROYCE plc, London (GB)

(72) Inventors: Eduardo Santana De Vega, Bristol (GB); Giuliano Allegri, Bristol (GB); Stephen Hallett, Bristol (GB); Ian Hamerton, Bristol (GB); Bing Zhang, Bristol (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 18/058,912

(22) Filed: Nov. 28, 2022

(65) Prior Publication Data
US 2023/0192979 A1    Jun. 22, 2023

(30) Foreign Application Priority Data
Dec. 16, 2021    (GB) .................................... 2118257

(51) Int. Cl.
*B32B 3/06* (2006.01)
*C08J 5/24* (2006.01)
*B29C 70/82* (2006.01)

(52) U.S. Cl.
CPC ............... *C08J 5/246* (2021.05); *B29C 70/82* (2013.01); *B32B 3/06* (2013.01); *C08J 2363/00* (2013.01); *C08J 2367/00* (2013.01); *C08J 2375/00* (2013.01); *C08J 2379/08* (2013.01); *C08J 2479/06* (2013.01)

(58) Field of Classification Search
None
See application file for complete search history.

(56) References Cited

U.S. PATENT DOCUMENTS

| | | |
|---|---|---|
| 6,106,646 A | 8/2000 | Fairbanks |
| 10,307,973 B2 | 6/2019 | Lander et al. |
| 2009/0301644 A1 | 12/2009 | Cahuzac et al. |
| 2018/0141287 A1 | 5/2018 | Lander et al. |

FOREIGN PATENT DOCUMENTS

| | | |
|---|---|---|
| AU | 2021103814 A4 | 8/2021 |
| EP | 2505342 A1 | 11/2010 |
| EP | 2889132 A1 | 7/2015 |
| GB | 2355469 A | 4/2001 |
| GB | 2539249 A | 12/2016 |

OTHER PUBLICATIONS

Great Britain search report dated Jun. 13, 2021, issued in GB Patent Application No. 2118257.1.
European Search report dated May 22, 2023, issued in EP Patent Application No. 22208028.5.

*Primary Examiner* — Alexander S Thomas (57) ABSTRACT

A Z-pin for increasing a delamination resistance of continuous fibre-reinforced polymer composites, formed of a composite material including a polymer matrix, and a plurality of fibres embedded in the polymer matrix and aligned along the length direction of Z-pin, the fibres having an elongation at break of at least 2% and a tensile strength of at least 5 GPa, the polymer matrix having an elongation at break equal to or greater than the elongation at break of the fibres, and a tensile strength of at least 120 MPa.

15 Claims, 6 Drawing Sheets

Z-PIN FOR INCREASING DELAMINATION RESISTANCE

CROSS-REFERENCE TO RELATED APPLICATIONS

This specification is based upon and claims the benefit of priority from United Kingdom patent application GB 2118257.1 filed on Dec. 16, 2021, the entire contents of which is incorporated herein by reference.

BACKGROUND

Technical Field

The present disclosure relates to a Z-pin for increasing a delamination resistance of continuous fibre-reinforced polymer composites, a component including a Z-pin, and a method of forming a Z-pin.

Description of the Related Art

Z-pins are conventionally used for increasing a delamination resistance of composite laminates, thus delaying or arresting the propagation of interlaminar cracks in the laminates. Z-pins bridge interlaminar cracks and oppose opening and sliding displacements, significantly increasing the energy necessary for delamination to progress. Depending on requirements, the Z-pins may be embedded in the composite so that they are perpendicular to the layers of the composite, or at an angle from this perpendicular direction. Either way, because Z-pins extend across layers, a Z-pin enters the wake of a growing interlaminar crack to exert a bridging action until it either ruptures or is completely pulled out from the embedding composite laminate. The latter mechanism provides the largest delamination-resistance effect, with most energy dissipated by frictional forces as the Z-pin is pulled out. Thus, the operation life of composite laminates can be prolonged, decreasing the risk of catastrophic failure.

Z-pins are conventionally formed either of metallic materials (as shown for example in U.S. patent Ser. No. 10/578, 115 B2) or of carbon-fibre-reinforced resins (as shown for example in U.S. patent application US 2018/0141287 A1 and U.S. patent Ser. No. 10/307,973 B2).

In general, there are two modes of delamination of composite laminates, i.e. mode I and mode II. In mode I, the layers of the composite laminate experience tensile forces perpendicular to the layers which pull the layers apart and cause a crack to grow between them. In mode II, the layers experience shear forces parallel to the layers which urge neighbouring layers to slide over each other and again cause a crack to grow between them. A composite laminate may experience a combination of mode I and mode II loads, referred to as mixed-mode delamination.

Conventional carbon-fibre-reinforced resin Z-pins perform well to resist delamination of mode I. Due to the surface roughness of their fibrous structure, and aided by a thermal expansion coefficient that is similar to that of the host laminate, the Z-pins strongly resist being frictionally pulled out of the layers but are also strong enough not to rupture under tension, whereby their eventual frictional pull out delays delamination and dissipates a lot of delamination energy when it finally occurs. However, under delamination of mode II, carbon-fibre-reinforced resin Z-pins typically rupture transversely without pulling out. Transverse rupturing dissipates much less delamination energy than frictional pull-out and, therefore, this type of Z-pin does not perform well under delamination of mode II.

In contrast, conventional metallic Z-pins perform well under delamination of mode II thanks to the ductility of the metal. Instead of transversely rupturing, the metallic Z-pins deform and bend before they are frictionally pulled out. This reduces the rate of delamination and dissipates much delamination energy before pull out eventually occurs. However, in mode I, metallic Z-pins typically pull out before much frictional energy has been dissipated because of their relatively low surface roughness and the relatively high thermal expansion coefficient mismatch between the host laminate and the Z-pins. Thus, metallic Z-pins do not perform well under delamination of mode I. Another disadvantage of metallic Z-pins is that they may experience galvanic corrosion, which impacts their durability and long-term performance.

Figure 1A:
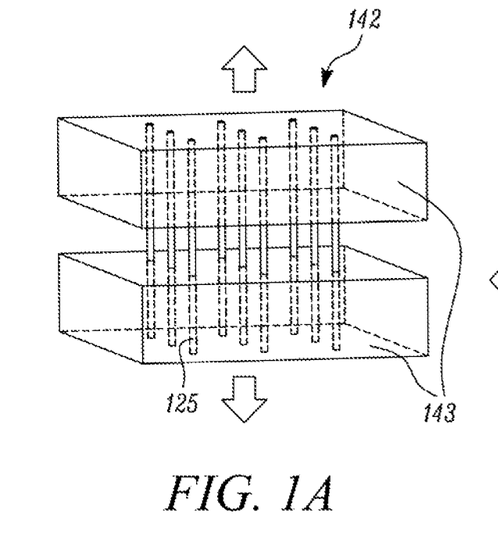
FIG. 1A is a schematic perspective view of a continuous fibre-reinforced polymer composite with carbon-fibre-reinforced resin Z-pins undergoing opening displacement.
Figure 1B:
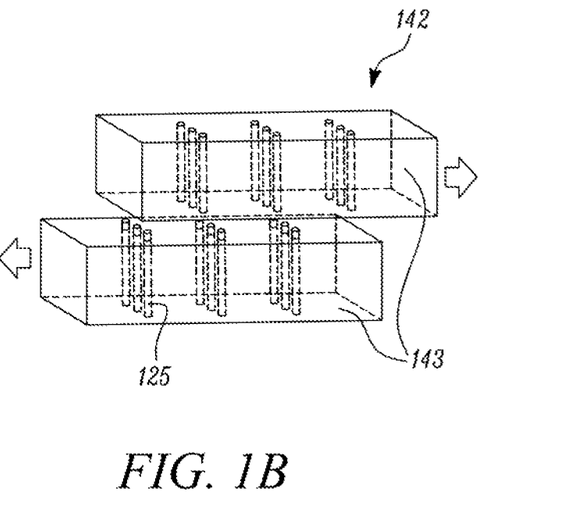
FIG. 1B is a schematic perspective view of a continuous fibre-reinforced polymer composite with carbon-fibre-reinforced resin Z-pins undergoing sliding displacement.
Figure 2A:
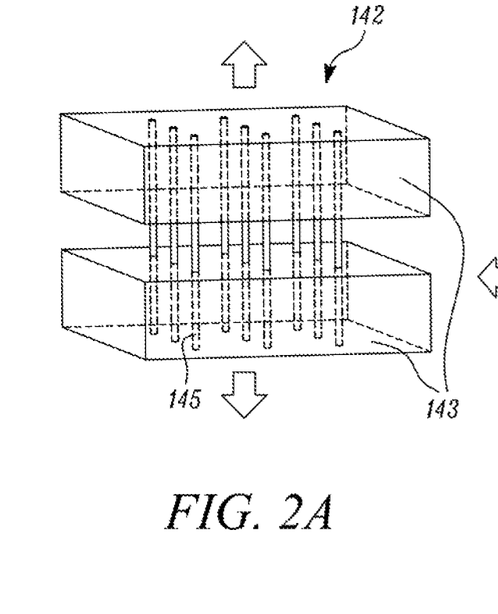
FIG. 2A is a schematic perspective view of a continuous fibre-reinforced polymer composite with metallic Z-pins undergoing opening displacement.
Figure 2B:
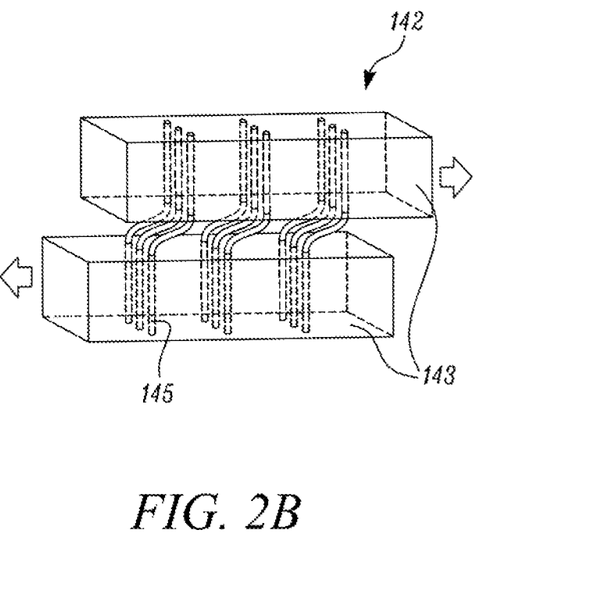
FIG. 2B is a schematic perspective view of a continuous fibre-reinforced polymer composite with metallic Z-pins undergoing sliding displacement.

These two modes are illustrated in FIGS. 1A and 1B, which show schematically a continuous fibre-reinforced polymer composite 142 derived from laid up pre-preg layers 143 and reinforced with carbon-fibre-reinforced resin Z-pins 125. The two modes are also illustrated in FIGS. 2A and 2B, which show schematically a continuous fibre-reinforced polymer composite 142 derived from laid up pre-preg layers 143 and reinforced with metallic Z-pins 145. FIGS. 1A and 2A illustrate the composites under the opening displacement and FIGS. 1B and 2B illustrate the composite under the sliding displacement. Block arrows indicate the direction in which a delamination force acts on the layers of the composite.

Thus, it is desirable to provide an improved Z-pin for increasing a delamination resistance of composite laminates, and more particularly of continuous fibre-reinforced polymer composites which may experience loads tending to generate both modes of delamination.

The present disclosure has been devised in light of the above considerations.

SUMMARY

In a first aspect, the present disclosure provides a Z-pin for increasing a delamination resistance of continuous fibre-reinforced polymer composites, the Z-pin being formed of a composite material including:

a polymer matrix; and a plurality of fibres embedded in the polymer matrix and aligned along the length direction of Z-pin, the fibres having an elongation at break of at least 2% and a tensile strength of at least 5 GPa;

wherein the polymer matrix has an elongation at break equal to or greater than the elongation at break of the fibres, and a tensile strength of at least 120 MPa.

Advantageously, the Z-pin according to the present disclosure has a fibrous structure which can produce a surface roughness to enhance the Z-pin's pull-out resistance from the continuous fibre-reinforced polymer composite. In addition, being polymer-based, the Z-pin can have a thermal expansion coefficient that is similar to that of a host continuous fibre-reinforced polymer composite. Under delamination of mode I, these properties enhance resistance to frictional pull out, while the high tensile strength of the fibres prevents premature tensile rupture. Furthermore, under delamination of mode II, the relatively high elongation at break of the polymer matrix allows the fibres in the pin to slide past each other as the Z-pin bends without rupturing, producing a pseudo ductile deformation of the Z-pin. Thus, high-resistance, frictional pull-out of the Z-pin from the continuous fibre-reinforced polymer composite can be achieved under each mode of delamination and combinations thereof. In this way, the Z-pin combines advantages of conventional carbon-fibre-reinforced resin Z-pins and metallic Z-pins, while avoiding their respective disadvantages. Therefore, the Z-pin according to the present embodiment can improve component longevity, durability, and reliability.

In a second aspect, the present disclosure provides a component formed of continuous fibre-reinforced polymer composite and including a plurality of Z-pins according to the first aspect inserted in the continuous fibre-reinforced polymer composite for increasing its delamination resistance.

The component may derive from laid up pre-preg layers, whereby the plurality of Z-pins extend across the layers to pin the layers together.

The continuous fibre-reinforced polymer composite of the component may be carbon-fibre-reinforced epoxy.

The glass transition temperature of the polymer matrix of the Z-pins may be higher than the curing temperature of the polymer composite of the continuous fibre-reinforced polymer composite of the component. Advantageously, this can help to prevent loss of structural integrity of the Z-pins during the curing process.

The thermal expansion coefficient of the Z-pins may be substantially the same as the thermal expansion coefficient of the continuous fibre-reinforced polymer composite of the component. Advantageously, this can help to maintain a close contact between the Z-pins and the continuous fibre-reinforced polymer composite in use, even if the component undergoes temperature changes. In this way, high levels of frictional dissipation of delamination energy during pull-out can be maintained.

The component may be, for example, a continuous fibre-reinforced polymer composite blade for a gas turbine engine (e.g. a fan blade or a compressor blade), an airframe structure, an energy absorbing structure (such as crash structure), a flange (such as a pipeline flange), a rotor craft blade, a wind turbine blade or a propeller blade. Aircraft components are particularly exposed to risks of delamination and therefore, and it is beneficial to increase their resistance to delamination via means such as Z-pins.

In a third aspect, the present disclosure provides a gas turbine engine having a propulsive fan or a compressor including a circumferential row of blades, each blade being the component of the second aspect.

In a fourth aspect, the present disclosure provides a method of forming the component according to the second aspect, the method including:
    providing laid up pre-preg layers; and
    inserting Z-pins into the pre-preg layers such that the Z-pins extend across the planes of the layers.

If the Z-pins are sufficiently stiff so as not to deform or break during the insertion into the pre-preg layers, they may be inserted directly. Alternatively, if the Z-pins are not sufficiently stiff, they may be inserted into the pre-preg layers by first forming guide holes in the pre-preg layers extending across the planes of the layers, and then using a hollow needle located in each hole as an insertion guide for each Z-pin.

The method may further include a subsequent step of curing (typically by applying heat and pressure) the pre-preg layers containing the inserted Z-pins.

Optional features of the disclosure will now be set out. These are applicable singly or in any combination with any aspect of the disclosure.

The polymer matrix of the Z-pin may be formed of any one of the following: epoxy, bismaleimide, cyanate ester, polyimide, polyester and co-polymers thereof. Such polymer matrix materials can have tensile strengths of at least 120 MPa and elongations at break equal to or greater than the elongation at break of the fibres.

The fibres of the Z-pin may be formed of poly(p-phenylene-2,6-benzobisoxazole). Advantageously, poly(p-phenylene-2,6-benzobisoxazole) has an elongation at break of about 2.5% and a tensile strength of about 5.8 GPa which is greatly superior to, for example, typical T300 carbon fibres which have an elongation at break of about 1.5% and a tensile strength of about 3.5 GPa. The enhanced elongation at break and tensile strength of poly(p-phenylene-2,6-benzobisoxazole) contributes to the Z-pin's ability to bend without rupturing under delamination of mode II, thus improving its reliability and longevity. However, other materials with similar properties may be used for forming the fibres, for example, poly-arylate, ultra-high molecular weight poly-ethylene, and some aramids.

The Z-pin may have further fibres embedded in the polymer matrix and aligned along the length direction of Z-pin. For example, the further fibres may be formed of a second material having an elongation at break of at least 2% and a tensile strength of at least 5 GPa, or may be formed of other less strong or less ductile material. For example, the Z-pin can combine poly(p-phenylene-2,6-benzobisoxazole) fibres and carbon fibres, even though the carbon fibres may only have an elongation at break of about 1.5% and a tensile strength of about 3.5 GP. Alternatively or additionally, aramid and/or steel fibres may be used as the further fibres. Such a combined-fibre pin may nonetheless exhibit overall properties which enable it to achieve high-resistance, frictional pull-out of the Z-pin from the continuous fibre-reinforced polymer composite under both delamination modes.

The Z-pin may comprise fibres manufactured via a pultrusion process.

The Z-pin may comprise fibres which have been twisted or braided prior to being embedded in the polymer matrix.

The Z-pin may have a diameter of 3 mm or less. A Z-pin having a diameter within these limits will be suitable for use in most applications.

Each fibre of the Z-pin may have a diameter of 1 µm or more, and preferably 5 µm or more. Each fibre of the Z-pin may have a diameter of 30 µm or less., and preferably 20 µm or less. In general, the diameter of the fibres selected to reinforce the polymer matrix of the Z-pin varies in proportion to the diameter of the Z-pin itself.

The ratio of volume of fibres to total volume of the composite material of the Z-pin may be 30% or more, and preferably 40% or more. The ratio of volume of fibres to total volume of the composite material of the Z-pin may be 80% or less, and preferably 70% or less.

As noted elsewhere herein, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 cm (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all values being dimensionless). The fan tip loading may be in an inclusive range bounded by any two of the values in the previous sentence (i.e. the values may form upper or lower bounds), for example in the range of from 0.28 to 0.31, or 0.29 to 0.3.

A fan blade and/or aerofoil portion of a fan blade described and/or claimed herein may be manufactured at least in part from a composite, for example an organic matrix composite, such as carbon fibre. However, at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments illustrating the principles of the disclosure will now be discussed with reference to the accompanying figures in which.

DETAILED DESCRIPTION

Aspects and embodiments of the present disclosure will now be discussed with reference to the accompanying figures. Further aspects and embodiments will be apparent to those skilled in the art. All documents mentioned in this text are incorporated herein by reference.

Figure 3:
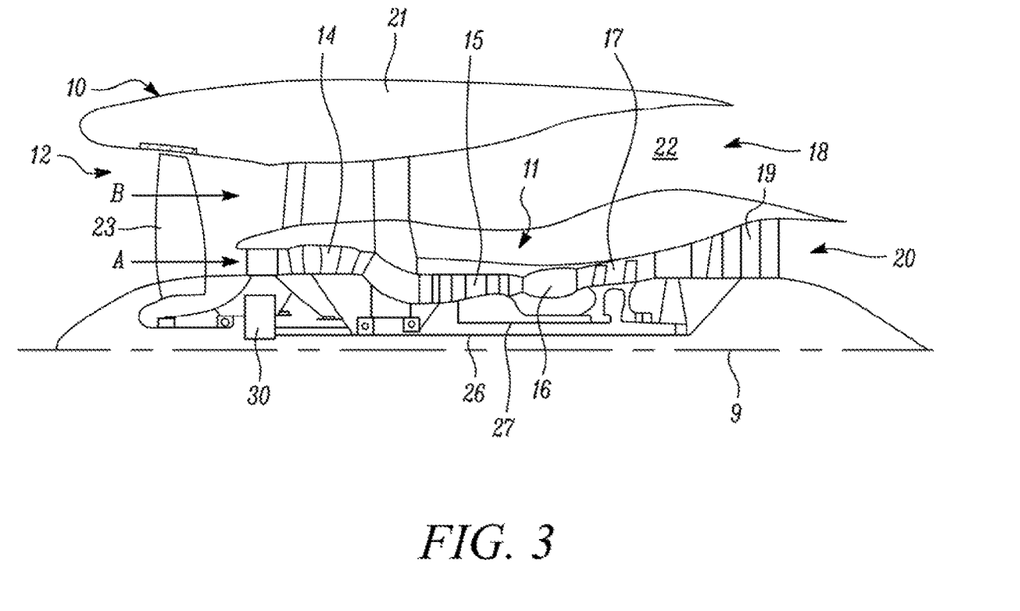
FIG. 3 is a sectional side view of a gas turbine engine.

FIG. 3 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 4:
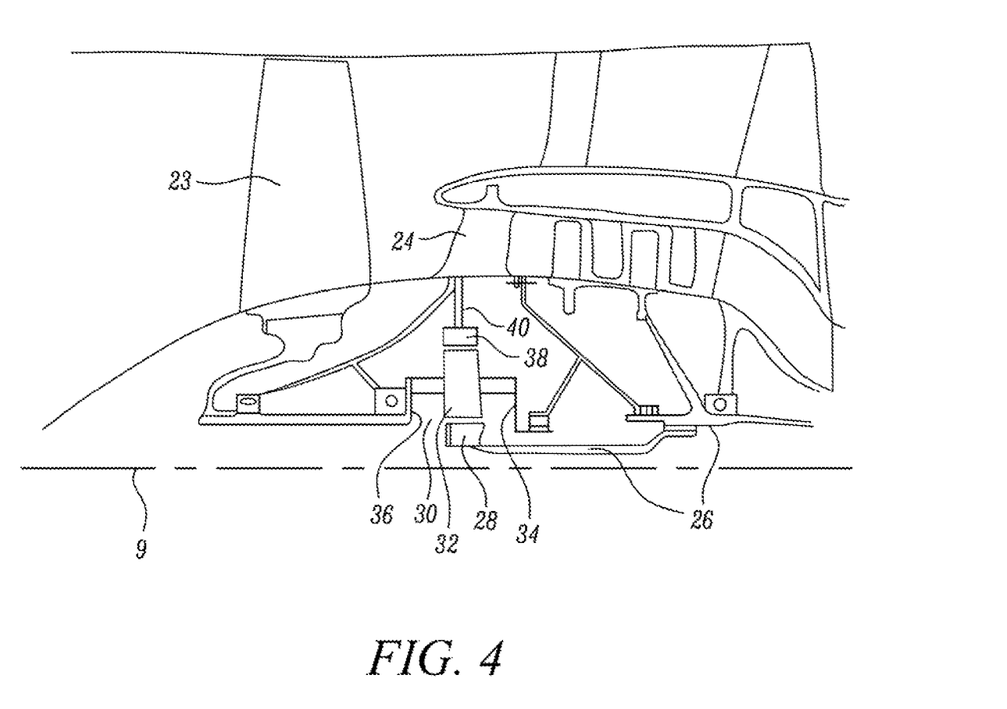
FIG. 4 is a close-up sectional side view of an upstream portion of a gas turbine engine.

An exemplary arrangement for a geared fan gas turbine engine 10 is shown in FIG. 4. The low pressure turbine 19 (see FIG. 3) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 5:
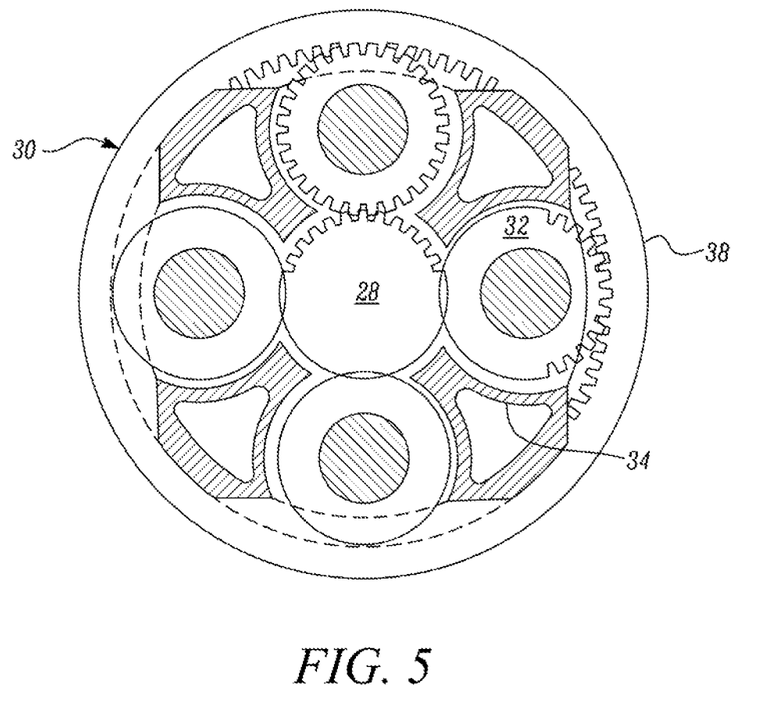
FIG. 5 is a partially cut-away view of a gearbox for a gas turbine engine.

The epicyclic gearbox 30 is shown by way of example in greater detail in FIG. 5. Each of the sun gear 28, planet gears 32 and ring gear 38 comprise teeth about their periphery to intermesh with the other gears. However, for clarity only exemplary portions of the teeth are illustrated in FIG. 5. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 4 and 5 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 4 and 5 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 4 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 4. For example, where the gearbox 30 has a star arrangement (described above), the skilled person would readily understand that the arrangement of output and support linkages and bearing locations would typically be different to that shown by way of example in FIG. 4.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 3 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 3), and a circumferential direction (perpendicular to the page in the FIG. 3 view). The axial, radial and circumferential directions are mutually perpendicular.

Components of the gas turbine 10, such as fan blades or compressor blades, may be formed of continuous fibre-reinforced polymer composite laid up pre-preg layers and strengthened with Z-pins. The continuous fibre-reinforced polymer composite may be, for example, carbon-fibre-reinforced epoxy. Other possible composite components which may be strengthened with Z-pins include airframe structures, energy absorbing structures (such as crash structures), flanges (such as pipeline flanges), helicopter rotor blades, propeller blades, and wind turbine blades.

Figure 6:
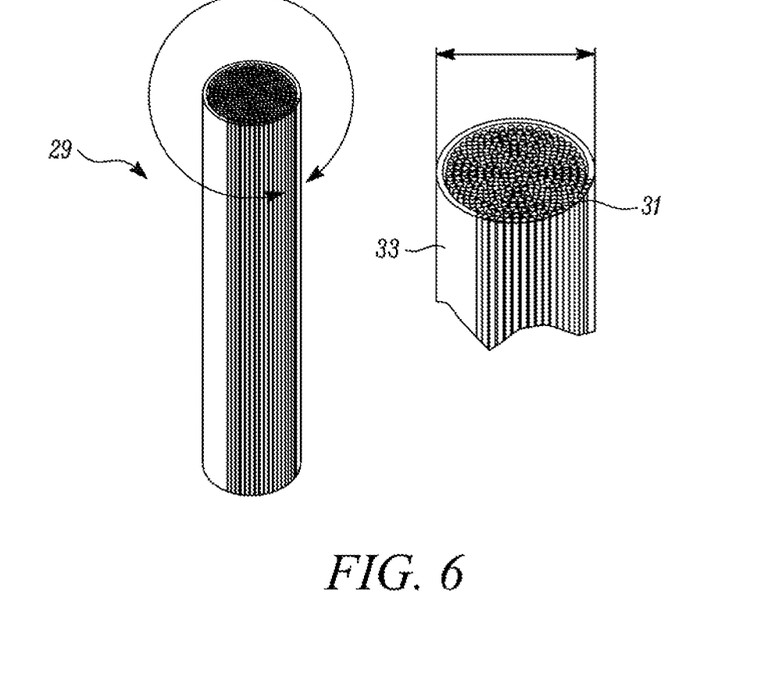
FIG. 6 is a schematic perspective view and a close up end view of a Z-pin.

FIG. 6 is a schematic perspective view and a close-up end view of an exemplary Z-pin 29 for strengthening such components. The Z-pin 29 has a circular cylindrical shape and is itself formed of a composite material in which a plurality of fibres 31 are embedded in a polymer matrix 33 and aligned along the length direction of the Z-pin, which is to say the fibres are unidirectionally aligned with, and extend in a direction parallel to, the length of the pin. The axial symmetry of the circular cylindrical shape facilitates the insertion the Z-pins into pre-formed guide holes. In the example Z-pin of FIG. 6, all the fibres 31 are shown as being oriented parallel to the length direction of the Z-pin, but it will be understood that in other embodiments some or all of the fibres may first be twisted or braided, with the twisted or braided fibres then being aligned along/oriented parallel to the length direction of the Z-pin.

As examples, the fibres may be formed of poly(p-phenylene-2,6-benzobisoxazole (PBO), and the matrix may be formed of epoxy, bismaleimide, cyanate ester, polyimide, polyester or co-polymers thereof. The fibres should have an elongation at break of at least 2% and a tensile strength of at least 5 GPa, and advantageously PBO fibres have a tensile strength of about 5.8 GPa and an elongation at break of about 2.5%. However, other materials with similar properties can also be used for forming the fibres, for example, poly-arylate, ultra-high molecular weight poly-ethylene, and some aramids. The polymer matrix material should have an elongation at break equal to or greater than the elongation at break of the fibres and a tensile strength of at least 120 MPa.

By controlling the respective elongations at break and tensile strengths of the fibres and the matrix, it is possible to enhance the performance of the corresponding Z-pins which they form. For example, if fibres with high elongation at break and high tensile strength (e.g. around 2.5% and 5 GPa respectively) are used, either a brittle (i.e. low-elongation) or a ductile (i.e. high-elongation) matrix can be used to realise the advantageous performance of the Z-pin of the present disclosure. That is because, under delamination of mode II, a ductile matrix will yield, further improving the performance of the Z-pin, whereas a brittle matrix will likely crack but without causing fibre rupture thus also ensuring reliable performance of the Z-pin.

Due to its composite nature, the Z-pin further has a roughened surface for improved frictional resistance during pull-out from the pre-preg layers 43. Depending on the application, the diameter of the Z-pin may range from 0.1 mm up to 1 mm or up to 3 mm. Each fibre may have a diameter ranging from 1 μm to 30 μm. Preferably, the ratio of volume of fibres to total volume of the composite material of the Z-pin ranges from 30% to 80%. A typical rod may have a fibre count of about 1000.

The pins may be manufactured by a pultrusion process, adapted for a polymer matrix such as a thermosetting resin. For example, the continuous fibres could be fed through a set of rollers into a polymer matrix bath, to be impregnated with the polymer matrix. Continuous fibres, for example dry PBO fibres, could be fed through a set of rollers into a polymer matrix bath where they are impregnated with the polymer matrix, for example a thermosetting resin.

Optionally, the fibres could be twisted or braided prior to being impregnated with a polymer matrix to produce more complex architectures to further enhance the performance of the pins. If the pin is being manufactured using a pultrusion process, the impregnated fibre tow can be fed into a heated die which shapes it into a rod of the required diameter. The gelled rod can then be post-cured in an oven and cut into the required lengths.

Figure 7A:
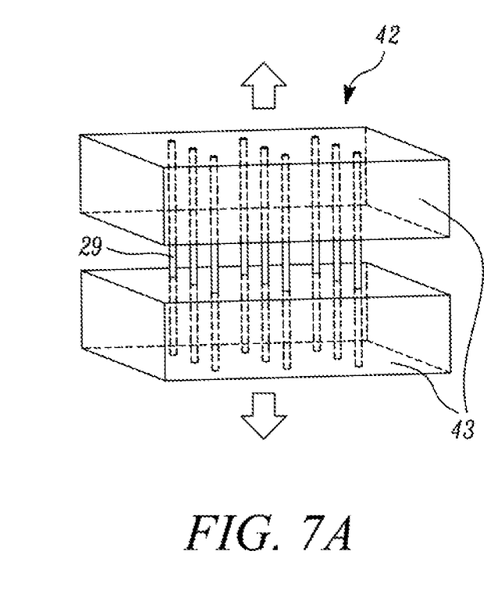
FIG. 7A is a schematic perspective view of a continuous fibre-reinforced polymer composite with Z-pins of FIG. 6 undergoing opening displacement.
Figure 7B:
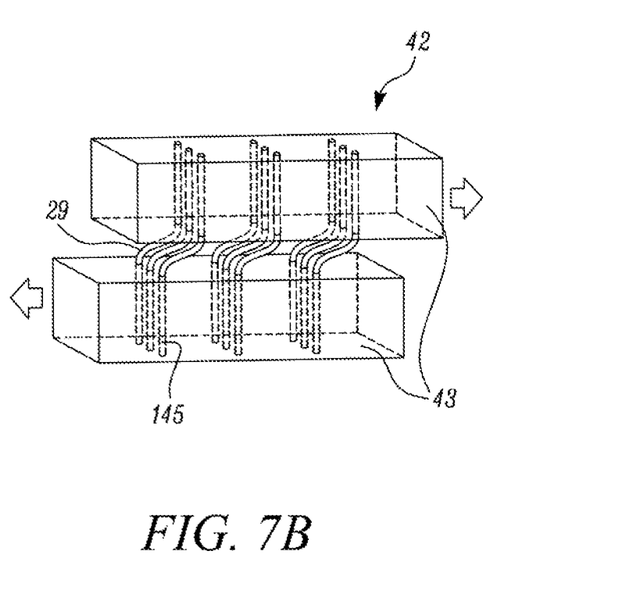
FIG. 7B is a schematic perspective view of a continuous fibre-reinforced polymer composite with Z-pins of FIG. 6 undergoing sliding displacement.

FIGS. 7A and 7B are schematic perspective views of the Z-pins 29 embedded in a continuous fibre-reinforced polymer composite 42 derived from laid up pre-preg layers 43 and forming a component such as a fan blade or compressor blade of the engine 10. FIG. 7A illustrates the behaviour of the composite under opening delamination of mode I. Similarly to the conventional carbon-fibre-reinforced resin Z-pins 125 illustrated in FIG. 1A, due to their surface roughness, and aided by a thermal expansion coefficient that is similar to that of the continuous fibre-reinforced polymer composite 42, the Z-pins 29 strongly resist being frictionally pulled out of the layers. Additionally, the Z-pins are strong enough not to rupture under tension, whereby their eventual frictional pull out delays delamination and dissipates significant amounts of energy when delamination finally occurs. FIG. 7B illustrates the behaviour of the composite under shearing delamination of mode II. Similarly to the conventional ductile metallic Z-pins 145 illustrated in FIG. 2B, the Z-pins 29 deform and bend before they are frictionally pulled out, instead of transversely rupturing. This delays pull-out and dissipates much energy when delamination eventually occurs.

Thus, the Z-pins 29 combine advantages of the conventional carbon-fibre-reinforced resin Z-pins 125 and the metallic Z-pins 145 while avoiding respective disadvantages such as, for example, susceptibility to galvanic corrosion. Therefore, the Z-pins 29 provide improved longevity, durability, and reliability under both delamination modes or combinations thereof.

Figure 8:
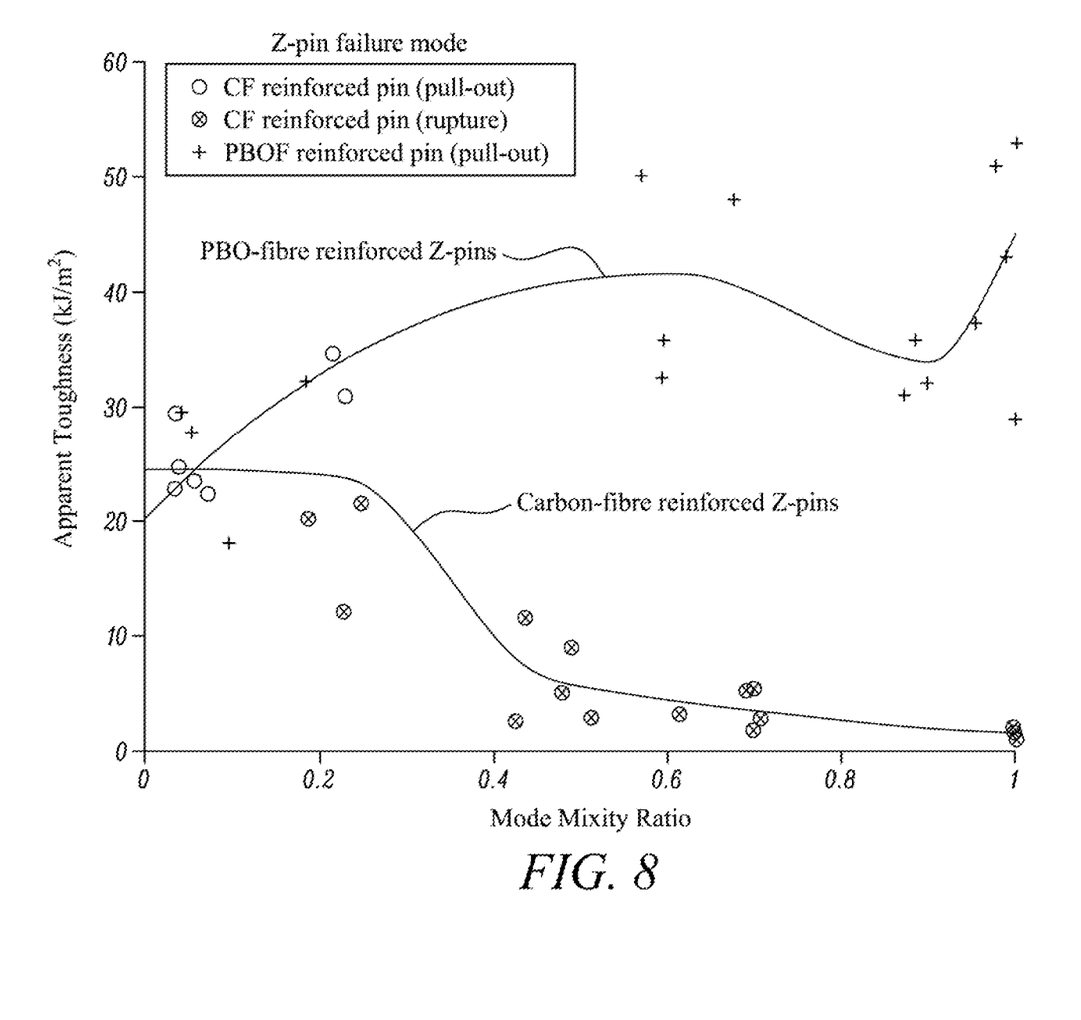
FIG. 8 are experimentally derived comparative plots showing the apparent toughnesses of composites strengthened by two types of Z-pins as a function of the mode mixity ratio.

To illustrate this, FIG. 8 are experimentally derived comparative plots comparing the apparent toughnesses of a continuous fibre-reinforced polymer composite strengthened by conventional carbon-fibre reinforced composite Z-pin 125 and a continuous fibre-reinforced polymer composite strengthened by a PBO-fibre reinforced composite Z-pin 29 as a function of the mode mixity ratio. The mode mixity ratio is defined as the amount of mode II present in mode I. Thus, a mode mixity ratio of 0 corresponds to delamination purely of mode I, a mode mixity ratio of 1 corresponds to delamination purely of mode II, and a mode mixity ratio of 0.5 corresponds to delamination of a combination of equal amounts of modes I and II. As the delamination transitions from mode I to mode II, the likelihood of rupture of the carbon-fibre reinforced resin Z-pins increases and, therefore, the apparent toughness of the composite strengthened with these Z-pins decreases significantly at a mode mixity ratio of about 0.3. In contrast, the PBO-fibre reinforced resin Z-pins do not rupture and eventually fail by pull out across the entire range of mode mixity ratios. This leads to the composite strengthened with these Z-pins having approximately the same apparent toughness as the composite strengthened with carbon-fibre reinforced resin Z-pins at a mode mixity ratio of 0, but then actually increasing to higher levels of apparent toughness as the mode mixity progresses to 1.

Figure 9A:
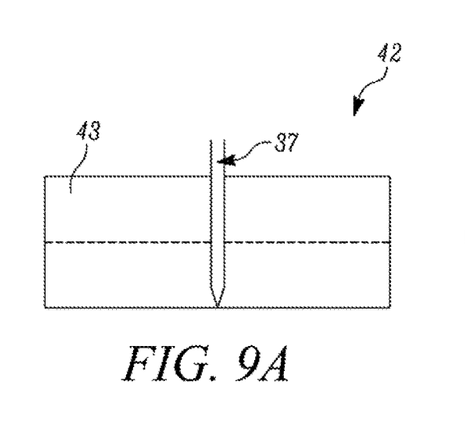
FIG. 9A is a schematic front view illustrating a step of a method of insertion of a Z-pin into a continuous fibre-reinforced polymer composite.
Figure 9B:
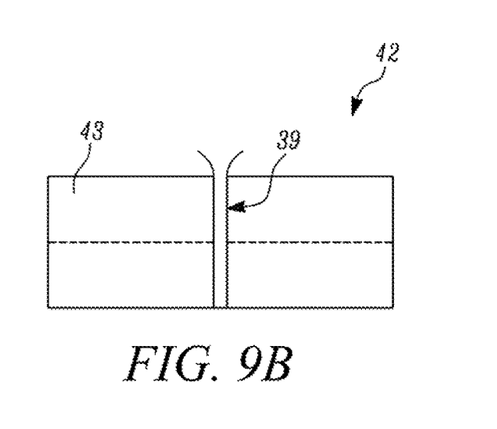
FIG. 9B is a schematic front view illustrating a step of a method of insertion of a Z-pin into a continuous fibre-reinforced polymer composite.
Figure 9C:
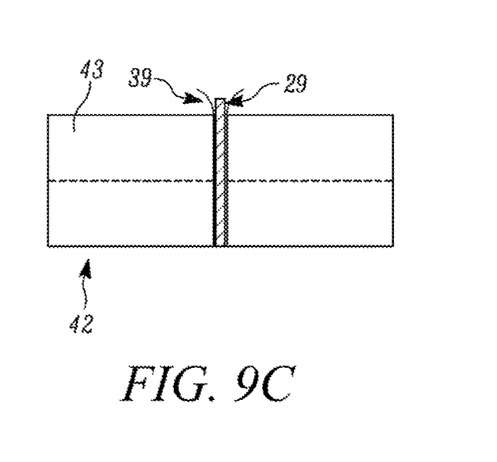
FIG. 9C is a schematic front view illustrating a step of a method of insertion of a Z-pin into a continuous fibre-reinforced polymer composite.
Figure 9D:
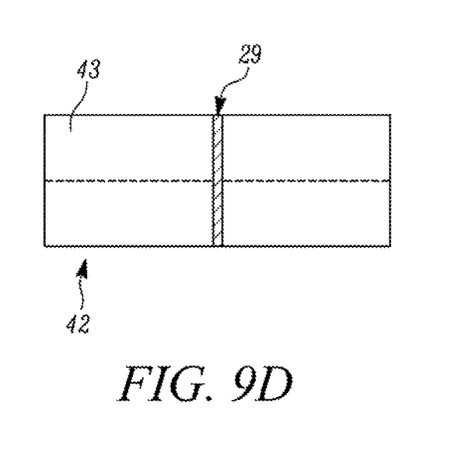
FIG. 9D is a schematic front view illustrating a step of a method of insertion of a Z-pin into a continuous fibre-reinforced polymer composite.

United Kingdom patent application GB 2539249 A, U.S. patent application US 2018/0141287 A1, and U.S. patent Ser. No. 10/307,973 disclose methods of inserting Z-pins into composite components, the methods disclosed therein being suitable also for inserting the Z-pins 29. For example, FIGS. 9A-9D schematically illustrate steps of a method of insertion of a Z-pin 29 into a continuous fibre-reinforced polymer composite 42. Firstly, as seen in FIG. 9A, a solid needle 37 is inserted across multiple laid up uncured pre-preg layers 43 to form a guide hole. Then, as seen in FIG. 9B, the solid needle 37 is retracted from the guide hole and a hollow needle 39 is inserted in its place. The hollow needle 37 serves a guide for inserting a Z-pin 29. As seen in FIG. 9C, the Z-pin 29 is then inserted into the guide hole via the hollow needle 39. The hollow needle 39 is then removed and FIG. 9D shows the final result, whereby the Z-pin 29 extends across the pre-preg layers 43 to pin them together. The whole structure can then be cured, typically by applying heat and/or pressure. The glass transition temperature of the polymer matrix of the Z-pins 29 can be higher than the curing temperature of the polymer composite of the continuous fibre-reinforced polymer composite 42. This is to prevent loss of structural integrity of the Z-pins 29 during the curing process which would consequently compromise their delamination-resistance performance.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

It will be understood that the disclosure is not limited to the embodiments above-described and various modifications and improvements can be made without departing from the concepts described herein.

We claim:

1. A Z-pin for increasing a delamination resistance of continuous fibre-reinforced polymer composites, the Z-pin being formed of a composite material including:
    a polymer matrix; and
    a plurality of fibres embedded in a polymer matrix and aligned along the length direction of Z-pin, the fibres having an elongation at break of at least 2% and a tensile strength of at least 5 GPa;
    wherein the polymer matrix has an elongation at break equal to or greater than the elongation at break of the fibres, and a tensile strength of at least 120 MPa.

2. The Z-pin of claim 1, wherein the polymer matrix is formed of any one of the following: epoxy, bismaleimide, cyanate ester, polyimide, polyester or co-polymers.

3. The Z-pin of claim 1, wherein the fibres are formed of poly(p-phenylene-2,6-benzobisoxazole).

4. The Z-pin of claim 1, wherein the manufacture of the fibres comprises a pultrusion process.

5. The Z-pin of claim 1, wherein the fibres are twisted or braided prior to being embedded in the polymer matrix.

6. The Z-pin of claim 1 which has a diameter of 3 mm or less.

7. The Z-pin of claim 1, wherein each fibre has a diameter of 1 μm or more.

8. The Z-pin of claim 1, wherein each fibre has a diameter of 30 μm or less.

9. The Z-pin of claim 1, wherein the ratio of volume of fibres to total volume of the composite material is 30% or more.

10. The Z-pin of claim 1, wherein the ratio of volume of fibres to total volume of the composite material is 80% or less.

11. A component formed of continuous fibre-reinforced polymer composite and including a plurality of Z-pins inserted in the continuous fibre-reinforced polymer composite for increasing its delamination resistance, the Z-pin being formed of a composite material including:
    a polymer matrix; and
    a plurality of fibres embedded in a polymer matrix and aligned along the length direction of Z-pin, the fibres having an elongation at break of at least 2% and a tensile strength of at least 5 GPa;
    wherein the polymer matrix has an elongation at break equal to or greater than the elongation at break of the fibres, and a tensile strength of at least 120 MPa.

12. The component of claim 11, wherein the glass transition temperature of the polymer matrix of the Z-pins is higher than the curing temperature of the polymer composite of the continuous fibre-reinforced polymer composite.

13. The component of claim 11, wherein the thermal expansion coefficient of the Z-pins is substantially the same as the thermal expansion coefficient of the continuous fibre-reinforced polymer composite.

14. A method of forming a component formed of continuous fibre-reinforced polymer composite and including a plurality of Z-pins inserted in the continuous fibre-reinforced polymer composite for increasing its delamination resistance, the Z-pin being formed of a composite material including:
    a polymer matrix; and
    a plurality of fibres embedded in a polymer matrix and aligned along the length direction of Z-pin, the fibres having an elongation at break of at least 2% and a tensile strength of at least 5 GPa;
    wherein the polymer matrix has an elongation at break equal to or greater than the elongation at break of the fibres, and a tensile strength of at least 120 MPa, the method including:
    providing laid up pre-preg layers; and
    inserting the Z-pins into the pre-preg layers such that the Z-pins extend across the planes of the layers.

15. The method of claim 14, further including a subsequent step of curing the pre-preg layers containing the inserted Z-pins by applying heat and/or pressure.

* * * * *